Dec. 6, 1955  R. G. LEE ET AL  2,725,944
STABILIZER SYSTEM FOR MOTOR VEHICLES
Filed Jan. 29, 1953

INVENTORS
RAY G. LEE
HORACE E. DILLARD

BY *Alexander B. Blain*

ATTORNEY

United States Patent Office 2,725,944
Patented Dec. 6, 1955

2,725,944

STABILIZER SYSTEM FOR MOTOR VEHICLES

Ray G. Lee and Horace E. Dillard, Kansas City, Mo.

Application January 29, 1953, Serial No. 333,988

1 Claim. (Cl. 180—1)

This invention relates to a vehicle stabilizing system and more particularly to such a system involving the use of atmospheric pressure for such purpose.

A primary object of the invention is the provision of a means for directing a flow of air under pressure through and below the body of a motor vehicle for the purpose of applying such pressure to the rear end thereof in order to reduce a partial vacuum which may be developed at the rear of the vehicle.

A further object is the provision of means exerting equal atmospheric pressure on opposite sides of the vehicle tending to hold the rear of the vehicle against skidding.

Still another object is the provision of means tending to deflect mud or water rearwardly from the rear wheels of the vehicle by the deflection of an airflow in a direction to accomplish this.

Still other objects will in part be obvious and in part be pointed out hereinafter and shown in the accompanying drawing wherein there are disclosed preferred embodiments of this inventive concept.

In the drawings.

Similar reference characters refer to similar parts throughout the several views of the drawing.

Figure 1:
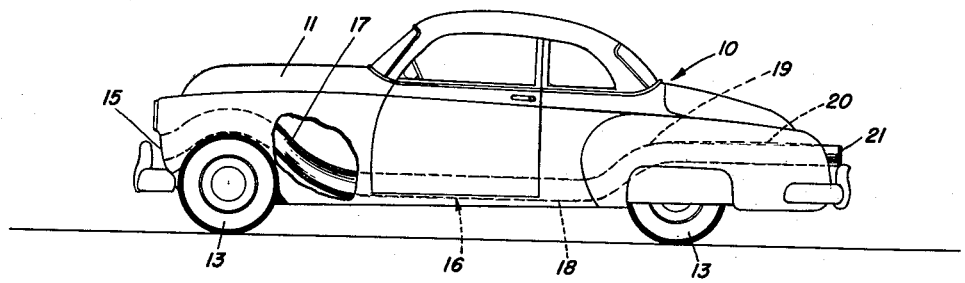
Fig. 1 is a side elevational view partially in section of a motor vehicle embodying this inventive concept.
Figure 2:
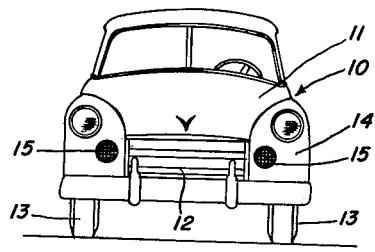
Fig. 2 is a front elevational view of the vehicle of Fig. 1.
Figure 3:
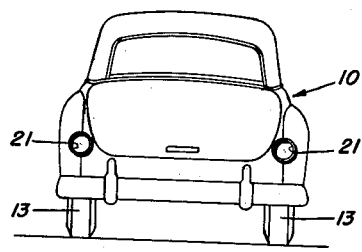
Fig. 3 is a rear elevational view thereof.
Figure 4:
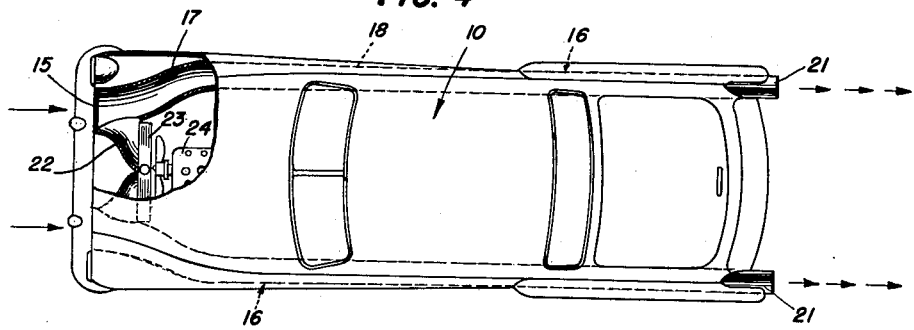
Fig. 4 is a top plan view partially in section of the vehicle of Fig. 1 to Fig. 3, certain concealed parts thereof being indicated in dotted lines.

Referring now to the drawings in detail, there is generally indicated at 10 a motor vehicle of any desired conventional construction, including a hood 11, a front grill 12, wheels 13 and the other conventional appurtenances. In the front of the fenders 14 on opposite sides of the grill 12 are disposed a pair of screens or filters 15 which serve to cover the inlets of tubular passages generally indicated at 16 which extend the full length of the vehicle on opposite sides thereof. Passages 16 include upwardly curved portions 17 adapted to extend over the front axle housing and horizontal portions 18 which extend along the lowermost portion of the body of the vehicle on opposite sides thereof lying between the front and rear fenders being depressed. These passages 18 terminate in upwardly extending portions 19 for the purpose of clearing the rear axle housing and thence extend into horizontal portions 20 which terminate in rearwardly-opening exhaust ports 21 on opposite sides of the vehicle and to the rear thereof. Adjacent the grills 15 at the forward end of passages 16 are located angularly-disposed and curved by-passageways 22 which are adapted to deflect a portion of the air entering through grills 15 to the radiator 23 of the vehicle motor 24, see Fig. 4.

Figure 5:
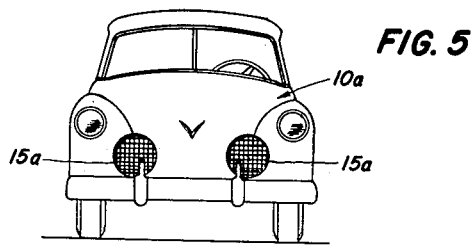
Fig. 5 is a front plan view of a slightly modified plan of construction.

In Fig. 5 there is disclosed a slight modification of the device wherein the vehicle 10a is characterized by the absence of grill openings similar to openings 12, and the grills 15a comprising the intake openings of passages corresponding to passages 16 are substantially enlarged in order to afford additional cooling and radiation to the radiator.

In the use and operation of the device, it will be readily apparent that the air entering grills 15 and passed rearwardly through the tubes 16 will have a tendency to hold the vehicle relatively close to the road, and further, due to the opposite equalization of atmospheric pressure at the rear of the vehicle will tend to eliminate sidesway and skidding. It will further be apparent that this effect will be enhanced and increased as the speed of the vehicle is increased due to the increase in air pressure through the tubes 16.

As various embodiments may be made of this inventive concept and as various changes and modifications may be made in the embodiments hereinbefore shown and described, it is to be understood that all matter herein is to be interpreted merely as illustrative and not in a limiting sense.

What is claimed is:

In a motor vehicle having front and rear fenders and a centrally disposed engine radiator, a stabilizer system comprising a pair of tubes respectively extending longitudinally from the front to the rear of the vehicle along the opposite sides thereof and substantially within the confines of the front and rear fenders thereof for directing air from the front to the rear of the vehicle, each of said tubes having at least a portion of their lengths between the front and rear fenders being depressed, the intakes of said tubes being positioned beneath the front fenders and slightly inwardly thereof, said tubes each having a single outlet rearwardly of each rear fender of said vehicle, said tubes being of a diameter to direct a substantial body of air longitudinally of said vehicle, air filtering grills covering the intakes of said tubes, and curved by-passageways adapted to deflect a portion of the air entering through the grills to the engine radiator of said vehicle.

References Cited in the file of this patent

UNITED STATES PATENTS

| 657,684 | Vorreiter | Sept. 11, 1900 |
| 1,585,281 | Craddock | May 18, 1926 |
| 2,358,663 | Scott-Iversen | Sept. 19, 1944 |

FOREIGN PATENTS

| 690,318 | Germany | Apr. 22, 1940 |
| 442,112 | Germany | Mar. 23, 1927 |
| 443,903 | Great Britain | Mar. 5, 1936 |